(12) United States Patent
Imafuku et al.

(10) Patent No.: US 10,525,828 B2
(45) Date of Patent: Jan. 7, 2020

(54) TRANSFER FOR A VEHICLE (71) Applicant: TOYOTA JIDOSHA KABUSHIKI KAISHA, Toyota-shi, Aichi-ken (JP)

(72) Inventors: Mizuki Imafuku, Kariya (JP); Akinori Homan, Toyota (JP); Tomohiro Arakawa, Komaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1129 days.

(21) Appl. No.: 14/875,089

(22) Filed: Oct. 5, 2015

(65) Prior Publication Data
US 2016/0096429 A1 Apr. 7, 2016

(30) Foreign Application Priority Data

Oct. 7, 2014 (JP) .................................. 2014-206779

(51) Int. Cl.
*B60K 17/344* (2006.01)
*F16H 61/32* (2006.01)

(52) U.S. Cl.
CPC ........... *B60K 17/344* (2013.01); *F16H 61/32* (2013.01); *F16H 2061/326* (2013.01)

(58) Field of Classification Search
CPC .. B60K 17/344; F16H 61/32; F16H 2061/326
USPC ...................................................... 180/233
See application file for complete search history.

(56) References Cited

U.S. PATENT DOCUMENTS

| | | | |
|---|---|---|---|
| 4,759,233 A * | 7/1988 | Woodbridge | B60K 17/3465 475/231 |
| 5,330,030 A | 7/1994 | Eastman et al. | |
| 5,407,024 A * | 4/1995 | Watson | B60K 17/342 180/197 |
| 5,788,008 A * | 8/1998 | Fort | F16D 28/00 180/247 |
| 5,984,821 A * | 11/1999 | Showalter | B60K 17/3467 475/204 |
| 5,992,592 A * | 11/1999 | Showalter | F16D 41/16 192/43.1 |
| 6,022,289 A * | 2/2000 | Francis | B60K 17/3467 475/204 |
| 6,099,430 A | 8/2000 | Winks | |

(Continued)

*Primary Examiner* — Joseph M Rocca
*Assistant Examiner* — Conan D Duda
(74) *Attorney, Agent, or Firm* — Oliff PLC (57) ABSTRACT

A transfer for a vehicle, the transfer includes an input rotating member, a first output rotating member, a second output rotating member, a high-low switching mechanism, a clutch, a motor, a screw mechanism and a transmitting mechanism. The first output rotating member outputs power to first left and right wheels. The second output rotating member outputs power to second left and right wheels. The high-low switching mechanism changes a rate of rotation from the input rotating member and transmits the rotation to the first output rotating member. The clutch adjusts a transfer torque. The transfer torque is transmitted from the first output rotating member to the second output rotating member. The screw mechanism converts rotational motion of the motor to linear motion. The transmitting mechanism transmits linear motion force of the screw mechanism to both the high-low switching mechanism and the clutch.

8 Claims, 4 Drawing Sheets

(56) References Cited

U.S. PATENT DOCUMENTS

| | | | | |
|---|---|---|---|---|
| 6,779,641 | B2* | 8/2004 | Vonnegut | B60K 17/3505 |
| | | | | 180/247 |
| 9,989,151 | B2* | 6/2018 | Imafuku | B60K 17/08 |
| 9,994,103 | B2* | 6/2018 | Takaira | B60K 17/02 |
| 10,124,669 | B2* | 11/2018 | Imafuku | B60K 23/0808 |
| 10,145,472 | B2* | 12/2018 | Imafuku | B60K 17/02 |
| 2003/0032519 | A1* | 2/2003 | Lovatt | F16D 7/027 |
| | | | | 475/204 |
| 2003/0184171 | A1* | 10/2003 | Teraoka | F16H 48/24 |
| | | | | 310/80 |
| 2004/0162176 | A1* | 8/2004 | Foster | B60K 17/3462 |
| | | | | 475/210 |
| 2006/0011001 | A1* | 1/2006 | Showalter | B60K 23/0808 |
| | | | | 74/23 |
| 2006/0124429 | A1* | 6/2006 | Teraoka | F16D 28/00 |
| | | | | 192/94 |
| 2007/0251345 | A1 | 11/2007 | Kriebernegg et al. | |
| 2009/0312145 | A1* | 12/2009 | Pohl | F16H 15/50 |
| | | | | 477/37 |
| 2012/0010798 | A1 | 1/2012 | Ito | |
| 2014/0041468 | A1* | 2/2014 | Yukitake | F16H 61/32 |
| | | | | 74/63 |
| 2014/0163802 | A1* | 6/2014 | Tokai | F16H 61/14 |
| | | | | 701/22 |
| 2016/0096429 | A1* | 4/2016 | Imafuku | B60K 17/344 |
| | | | | 180/233 |
| 2017/0037961 | A1* | 2/2017 | Pritchard | F16H 61/18 |
| 2017/0130838 | A1* | 5/2017 | Imafuku | F16H 63/304 |
| 2017/0166052 | A1* | 6/2017 | Ogawa | B60K 23/08 |
| 2017/0166053 | A1* | 6/2017 | Ogawa | B60K 23/08 |

* cited by examiner

TRANSFER FOR A VEHICLE

INCORPORATION BY REFERENCE

The disclosure of Japanese Patent Application No. 2014-206779 filed on Oct. 7, 2014 including the specification, drawings and abstract is incorporated herein by reference in its entirety.

BACKGROUND OF THE INVENTION

1. Field of the Invention

The invention relates to a transfer for a vehicle, which includes an input rotating member, a first output rotating member, a second output rotating member, a high-low switching mechanism and a clutch.

2. Description of Related Art

US 2007/0251345 A describes a transfer that includes a high-low switching mechanism, and a multiple disc clutch that adjusts torque transmitted to an auxiliary driving wheel side. That is, the transfer described in US 2007/0251345 A is an example of a transfer for a vehicle, which includes a high-low switching mechanism that changes the rate of rotation from an input rotation member and transmits the resultant rotation to a first output rotating member, and a single disc or multiple disc clutch that adjusts the transfer torque transmitted from the first output rotating member to the second output rotating member. With the transfer described in US 2007/0251345 A, the switching operation of the high-low switching mechanism and the torque adjustment of the clutch are performed with a single motor. Therefore, with the transfer described in US 2007/0251345 A, a conversion mechanism that converts the rotation of the motor into linear motion employs a drum cam-type conversion mechanism for the switching operation of the high-low switching mechanism, and employs a conversion mechanism that uses a ball cam and a lever for torque adjustment of the clutch.

SUMMARY OF THE INVENTION

With a high-low switching mechanism, a relatively long stroke may be required. A clutch with a relatively short stroke may be used but large thrust may be required. On the other hand, the drum cam-type conversion mechanism described above may not have sufficient thrust for the torque adjustment of the clutch. Also, the conversion mechanism that uses a ball cam and a lever described above may not have a sufficient stroke for the switching operation of the high-low switching mechanism. Therefore, it may be difficult to employ the same system (a single system), i.e., the drum cam-type conversion mechanism or the conversion mechanism that has the ball cam and lever, for both the switching operation of the high-low switching mechanism and the torque adjustment of the clutch. Both systems, i.e., the drum cam-type conversion mechanism and the conversion mechanism that has the ball cam and lever, are able to convert rotation of the motor into linear motion. However, neither conversion mechanism is able to achieve both a long stroke and large thrust, so different systems would be employed, one for the switching operation of the high-low switching mechanism and one for the torque adjustment of the clutch. This may lead to an increase in the number of component parts, an increase in weight, an increase in cost, and deterioration in mountability due to increases in the overall length and the distance between axles.

The invention thus provides a transfer for a vehicle, in which the number of parts, weight, cost, and size are able to be reduced.

One aspect of the invention relates to a transfer for a vehicle that includes first left and right wheels and second left and right wheels. The transfer includes an input rotating member, a first output rotating member, a second output rotating member, a high-low switching mechanism, a clutch, a motor, a screw mechanism and a transmitting mechanism. The first output rotating member is configured to output power to the first left and right wheels. The second output rotating member is configured to output power to the second left and right wheels. The high-low switching mechanism is configured to change a rate of rotation from the input rotating member and transmit the rotation to the first output rotating member. The clutch is configured to adjust a transfer torque. The transfer torque is transmitted from the first output rotating member to the second output rotating member. The screw mechanism is configured to convert rotational motion of the motor to linear motion. The transmitting mechanism is configured to transmit linear motion force of the screw mechanism to both the high-low switching mechanism and the clutch.

According to this structure, high thrust is able to be applied to the clutch by the high boost function of the screw mechanism. Also, the stroke required to operate the high-low switching mechanism is able to be obtained by the screw mechanism. Accordingly, the switching operation of the high-low switching mechanism and the torque adjustment of the clutch (i.e., the adjustment of transfer torque that is transmitted to the second output rotating member (i.e., the second left and right wheels)) are possible with a single motor, the screw mechanism, and the transmitting mechanism. That is, by using the screw mechanism as a conversion mechanism to convert the rotational motion of the motor into linear motion, both the switching operation of the high-low switching mechanism and the torque adjustment of the clutch are able to be performed by a single system (i.e., the same system). As a result, the number of parts, the weight, the cost, and the size of the transfer for a vehicle are able to be reduced.

The transfer may further includes a dog clutch. The dog clutch may be configured to connect the first output rotating member and the second output rotating member together in an integrated manner. The transmitting mechanism may be configured to transmit the linear motion force of the screw mechanism to the dog clutch. According to this structure, the switching operation of a dog clutch (i.e., the transmission and interruption of power to the second output rotating member) are able to be performed by the same system that uses the screw mechanism.

In the transfer, the screw mechanism may include a rotating motion member and a linear motion member. The rotating motion member may be directly or indirectly connected to the motor. The linear motion member may be connected to the rotating motion member in a manner movable in a direction parallel to an axial center of the rotating motion member in response to rotation of the rotating motion member. The high-low switching mechanism may include a high-low sleeve, high side gear teeth that output rotation, and low side gear teeth that output rotation at a slower speed than the high side gear teeth. The high-low sleeve may be splined engaged with the first output rotating member. The high-low sleeve may be configured to move in a direction parallel to the axial center of the first output rotating member such that the high-low sleeve meshes with the high side gear teeth and the low side gear teeth, respectively. The transmitting mechanism may include a pressing member, a fork shaft and a fork. The pressing member may be connected to the linear motion member. The pressing member may be configured to press on the clutch. The fork shaft may be provided around another axial center that is parallel to the axial center of the rotating motion member. The fork shaft may be connected to the linear motion member. The fork may be fixed on the fork shaft. The fork may be connected to the high-low sleeve. According to this structure, the switching operation of the high-low switching mechanism and the torque adjustment of the clutch are able to be performed with a single motor, the screw mechanism, and the transmitting mechanism.

The transfer may further includes a dog clutch. The dog clutch may include locking teeth and a locking sleeve. The locking teeth may be provided on the second output rotating member. The locking sleeve may be spline engaged with the first output rotating member. The locking sleeve may be configured to move in the direction parallel to the axial center of the first output rotating member such that the locking sleeve meshes with the locking teeth. The transmitting mechanism may be configured to transmit the linear motion force of the screw mechanism to the locking sleeve via the high-low sleeve. According to this structure, the switching operation of the dog clutch is able to be performed by the same system that uses the screw mechanism.

In the transfer, the high-low sleeve may be provided between the second output rotating member and a support bearing of the input rotating member. The locking sleeve may be provided separate from and adjacent to the high-low sleeve, between the high-low switching mechanism and the second output rotating member. The transmitting mechanism may include a first spring and a second spring, the first spring urging the high-low sleeve and the locking sleeve toward sides away from each other, the second spring urging the locking sleeve toward a side away from the locking teeth. According to this structure, the high-low sleeve is able to move regardless of whether the locking sleeve is able to move. Also, even if the high-low sleeve and the locking sleeve are provided separately, the locking sleeve is able to be moved toward the side away from the locking teeth if the high-low sleeve is moved toward the side away from the locking sleeve.

In the transfer, the high-low sleeve may be configured to mesh with the high side gear teeth on the side away from the locking sleeve. The high-low sleeve may be configured to mesh with the low side gear teeth on the side near the locking sleeve. The locking sleeve may be configured to mesh with the locking teeth when the fork shaft is in a position that places the high-low sleeve in mesh with the low side gear teeth. The clutch may be arranged around an axial center of the first output rotating member in a position on an opposite side of the second output rotating member than the high-low switching mechanism, in an axial direction of the first output rotating member. The clutch may be pressed on by the pressing member that moves toward the second output rotating member side. The clutch may be pressed on by the pressing member when the fork shaft is in a position that places the high-low sleeve in mesh with the high side gear teeth. The clutch may be not pressed on by the pressing member when the fork shaft is in a position that places the high-low sleeve in mesh with the low side gear teeth. The transmitting mechanism may include a connecting mechanism. The connecting mechanism may be configured to connect the linear motion member with the fork shaft such that the linear motion member moves between a position where the clutch is pressed on by the pressing member and a position where the clutch is not pressed on by the pressing member, while the fork shaft remains in a position that places the high-low sleeve in mesh with the high side gear teeth. According to this structure, in a vehicle state in which the high-low sleeve is in mesh with the high-side gear teeth and is thus able to transmit relatively high-speed rotation to the first output rotating member (i.e., the first left and right wheels), torque that has been adjusted via the clutch is able to be transmitted to the second output rotating member (i.e., the second left and right wheels). Also, in this vehicle state, the locking sleeve will not mesh with the locking teeth, and the clutch will not be pressed on by the pressing member, so power is able to be transmitted to only the first left and right wheels. On the other hand, in a vehicle state in which the high-low sleeve is in mesh with the low-side gear teeth and is thus able to transmit relatively low-speed rotation to the first output rotating member, the locking sleeve is in mesh with the locking teeth, and the first output rotating member and the second output rotating member are placed in a directly-coupled state (direct drive state) by the dog clutch.

In the transfer, the rotating motion member may be a threaded shaft member. The linear motion member may be a nut member. The screw mechanism may be a ball screw in which the threaded shaft member and the nut member operate via a ball. According to this structure, high thrust is able to be applied to the clutch by the high boost function of the ball screw. Also, the stroke necessary to operate the high-low switching mechanism is able to be obtained by the ball screw. Further, the mechanical efficiency with which rotational motion is converted into linear motion is higher than it is when using a slip screw as the conversion mechanism to convert the rotational motion of the motor into linear motion.

In the transfer, the clutch may be a multiple disc clutch.

In the transfer, the clutch may be a single disc clutch.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described in detail with reference to the accompanying drawings.

Figure 1:
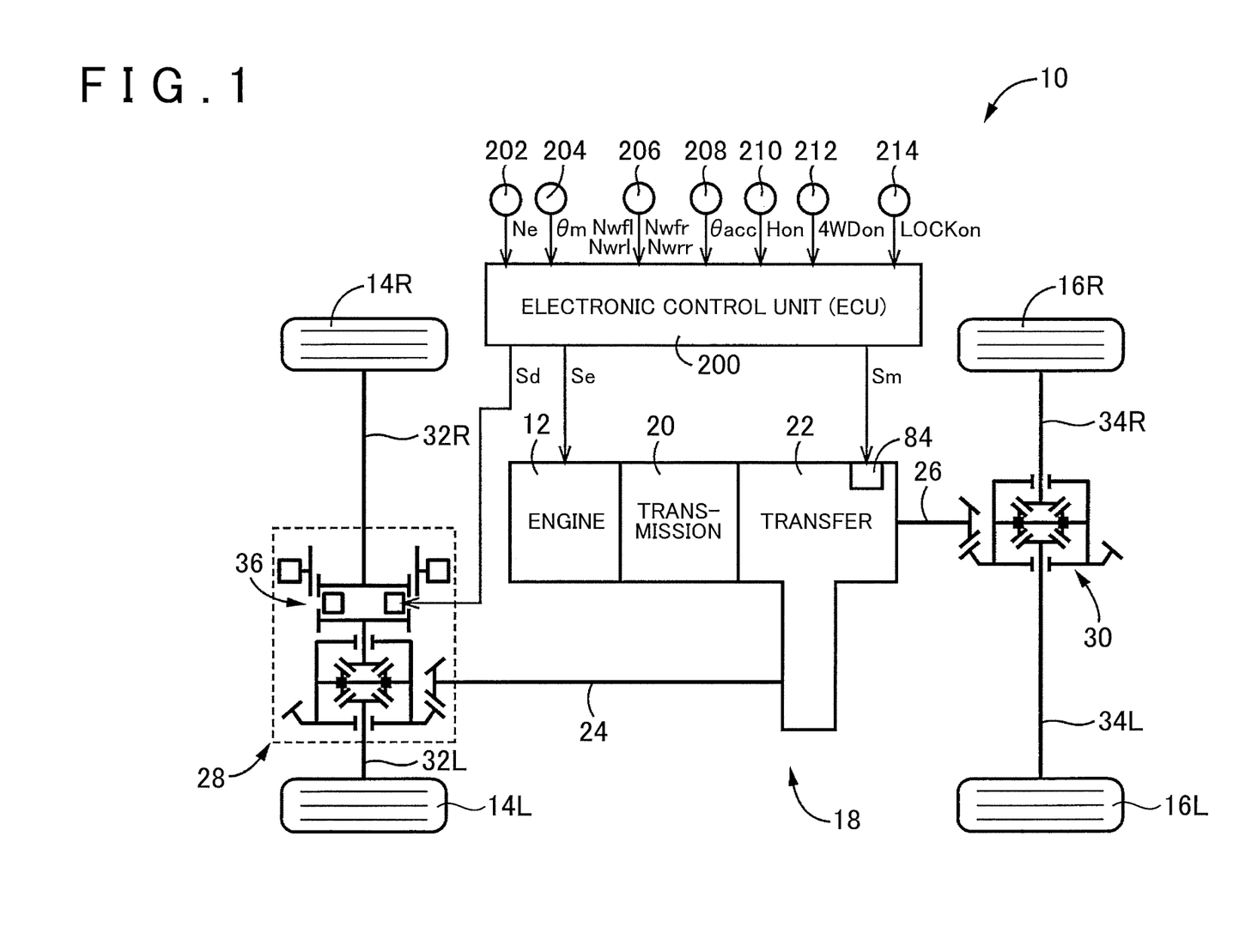
FIG. 1 is a view schematically showing the structure of a vehicle to which an example embodiment of the invention may be applied, and shows the main portions of a control system for various controls in the vehicle.

FIG. 1 is a view schematically showing the structure of a vehicle 10 to which the embodiment may be applied, and shows the main portions of a control system for various controls in the vehicle 10. As shown in FIG. 1, the vehicle 10 includes an engine 12 as a driving force source, left and right front wheels 14L, 14R (simply referred to as "front wheels 14" unless otherwise specified), left and right rear wheels 16L, 16R (simply referred to as "rear wheels 16" unless otherwise specified), and a power transmitting apparatus 18 that transmits power from the engine 12 to the front wheels 14 and the rear wheels 16, and the like. The rear wheels 16 are main driving wheels that are driving wheels both when running in two-wheel-drive (2WD) and in four-wheel-drive (4WD). The front wheels 14 are auxiliary driving wheels that are driven wheels when running in 2WD and are driving wheels when running in 4WD. Therefore, the vehicle 10 is a front engine rear wheel drive (FR)-based four-wheel-drive vehicle.

The power transmitting apparatus 18 includes a transmission 20, a vehicle transfer 22 (hereinafter, simply referred to as "transfer 22"), a front propeller shaft 24, a rear propeller shaft 26, a front wheel differential gear unit 28, a rear wheel differential unit 30, left and right front wheel axles 32L, 32R (simply referred to as "front wheel axles 32" unless otherwise specified), and left and right rear wheel axles 34L, 34R (simply referred to as "rear wheel axles 34" unless otherwise specified), and the like. The transmission 20 is connected to the engine 12. The transfer 22 is a front-rear wheel power transfer that is connected to the transmission 20. The front propeller shaft 24 and the rear propeller shaft 26 are both connected to the transfer 22. The front wheel differential gear unit 28 is connected to the front propeller shaft 24. The rear wheel differential unit 30 is connected to the rear propeller shaft 26. The front wheel axles 32 are connected to the front wheel differential gear unit 28. The rear wheel axles 34 are connected to the rear wheel differential unit 30. In the power transmitting apparatus 18, power from the engine 12 that has been transmitted to the transfer 22 via the transmission 20 is then transmitted from the transfer 22 to the rear wheels 16 via a power transmitting path on the rear wheel side that includes the rear propeller shaft 26, the rear wheel differential unit 30, and the rear wheel axles 34 and the like in this order. Some of the power from the engine 12 that is to be transmitted to the rear wheel 16 side is distributed to the front wheel 14 side by the transfer 22, and then transmitted to the front wheels 14 via a power transmitting path on the front wheel side that includes the front propeller shaft 24, the front wheel differential gear unit 28, and the front wheel axles 32 and the like in this order.

The front wheel differential gear unit 28 includes a front-side clutch 36 on the front wheel axle 32R side (i.e., between the front wheel differential gear unit 28 and the front wheel 14R). The front-side clutch 36 is a dog clutch (i.e., a mesh-type clutch) that is electrically (electromagnetically) controlled and selectively establishes or interrupts the power transmitting path between the front wheel differential gear unit 28 and the front wheel 14R. The front-side clutch 36 may also be provided with a synchronizing mechanism.

Figure 2:
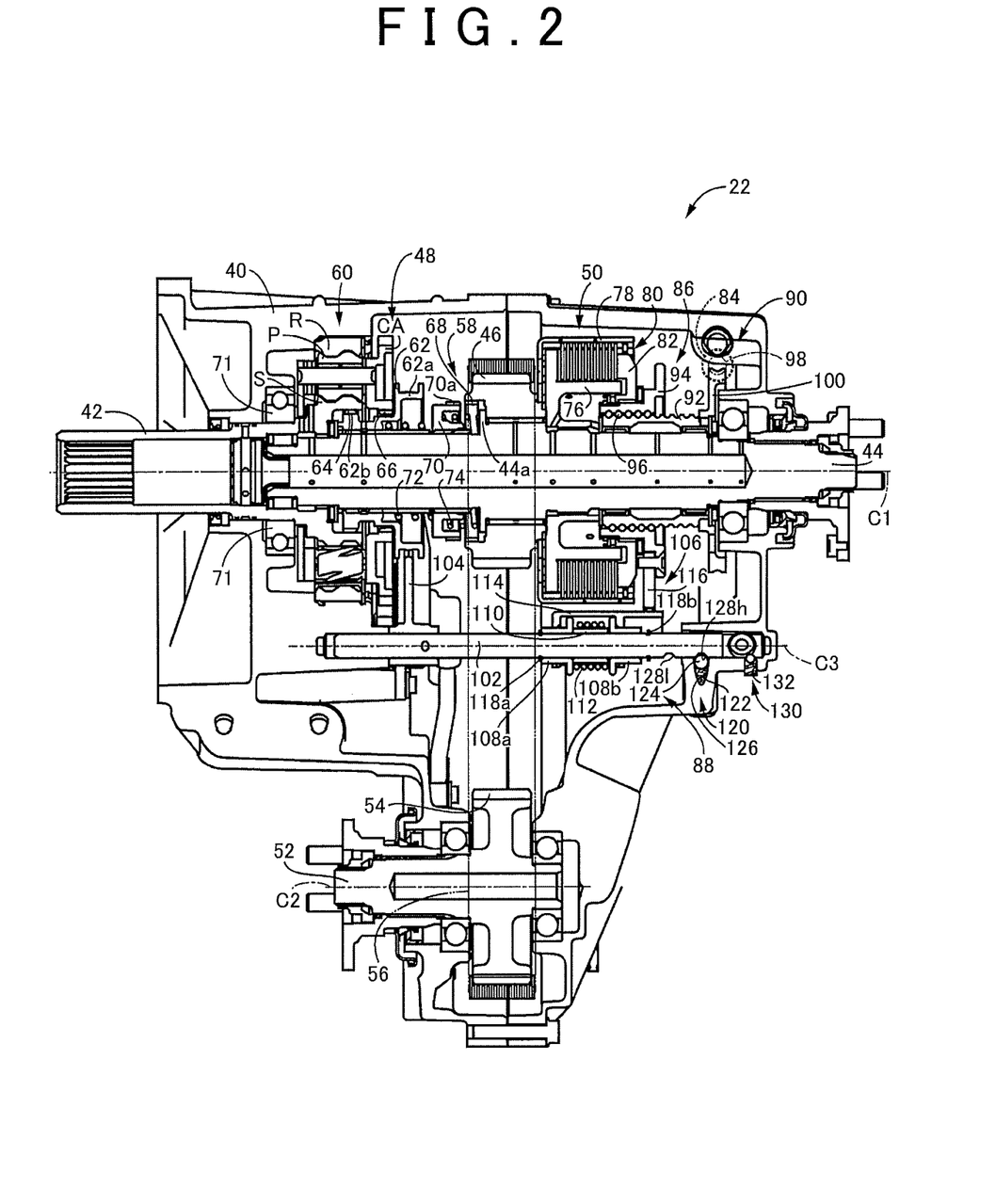
FIG. 2 is a sectional view schematically showing the structure of a transfer according to the example embodiment, and illustrates the manner for switching to a 4WD running state in a high-speed side gear.
Figure 3:
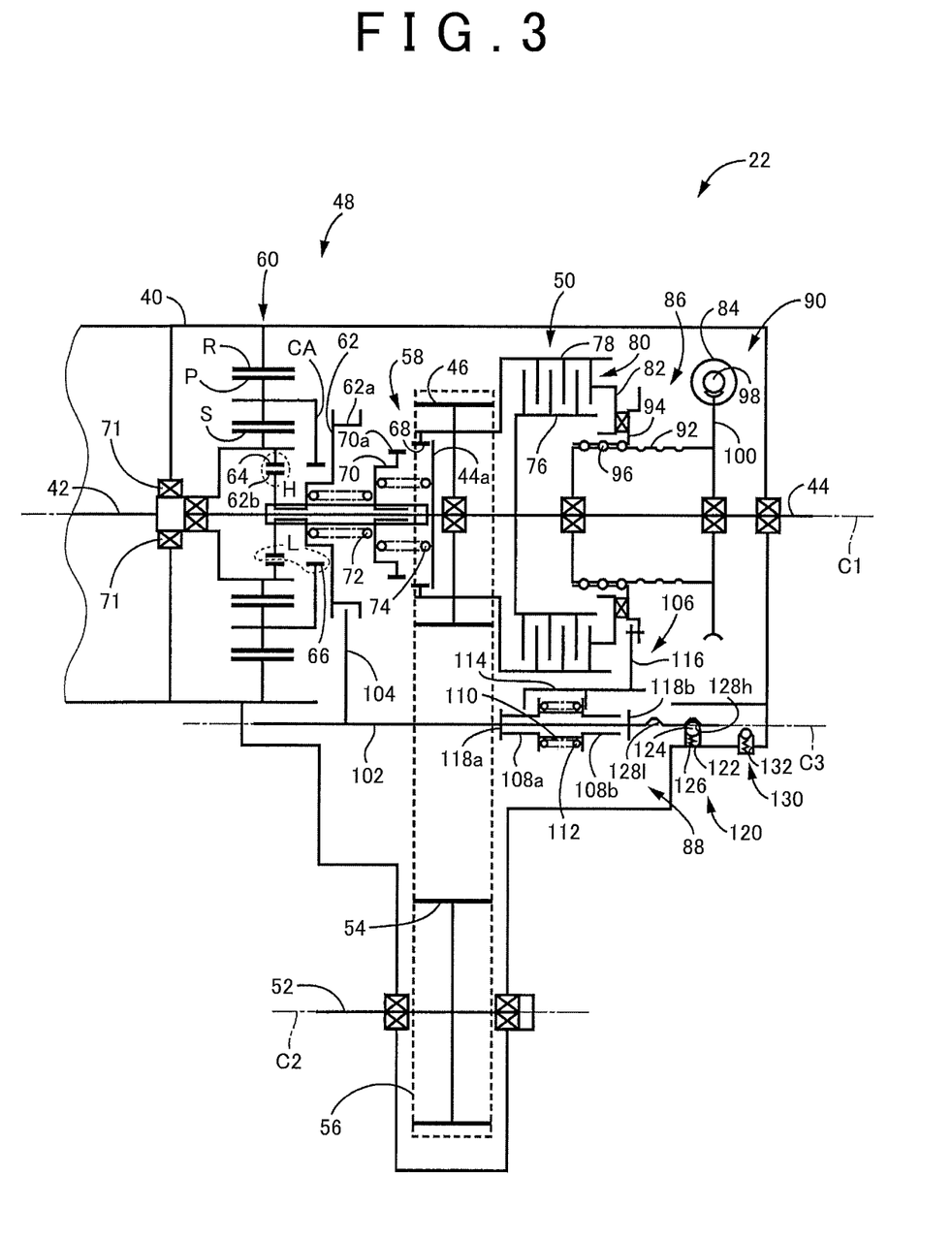
FIG. 3 is a skeleton view illustrating the general structure of the transfer according to the example embodiment.

FIGS. 2 and 3 are views schematically showing the structure of the transfer 22. FIG. 2 is a sectional view of the transfer 22, and FIG. 3 is a skeleton view of the transfer 22. As shown in FIGS. 2 and 3, the transfer 22 includes a transfer case 40 (one example of a non-rotating member). The transfer 22 includes, inside the transfer case 40 and all on a common axial center C1, an input shaft 42 (one example of the input rotating member), a rear-wheel side output shaft 44 (one example of the first output rotating member) that output power to the rear wheels 16 (one example of the first left and right wheels), a drive gear 46 (one example of the second output rotating member) that outputs power to the front wheels 14 (one example of the second left and right wheels), a high-low switching mechanism 48 as an auxiliary transmission that changes the rate of rotation input from the input shaft 42 and transmits the resultant rotation to the rear-wheel side output shaft 44, and a front-wheel drive clutch 50 as a multiple disc clutch that adjusts the transfer torque transmitted from the rear-wheel side output shaft 44 to the drive gear 46. The transfer 22 includes, inside the transfer case 40 and on a common axial center C2, a front-wheel side output shaft 52, and a driven gear 54 integrally provided on the front-wheel side output shaft 52. The transfer 22 also includes, inside the transfer case 40, a front-wheel drive chain 56 that connects the drive gear 46 and the driven gear 54 together, and a differential locking mechanism 58 (one example of a dog clutch) that integrally connects (i.e., locks) the rear-wheel side output shaft 44 and the drive gear 46 together.

The input shaft 42 is connected to an output rotating member, not shown, of the transmission 20, via a spline coupling or the like, and is rotatably driven by driving force (torque) input from the engine 12 via the transmission 20. The rear-wheel side output shaft 44 is a main drive shaft that is connected to the rear propeller shaft 26. The drive gear 46 is provided around the rear-wheel side output shaft 44 in a manner so as to be able to rotate relative to the rear-wheel side output shaft 44. The front-wheel side output shaft 52 is an auxiliary drive shaft that is connected to the front propeller shaft 24.

The transfer 22 structured in this way for example adjusts the torque transmitted to the drive gear 46, and transmits the power transmitted from the transmission 20 to only the rear wheels 16, or to both the front wheels 14 and the rear wheels 16. Also, the transfer 22 for example switches between a differential state in which differential rotation between the rear propeller shaft 26 and the front propeller shaft 24 is not restricted, and a non-differential state in which differential rotation between these is restricted (a so-called center differential locked state). Also, the transfer 22 for example establishes one of a high-speed side gear (a high-speed side speed) H and a low-speed side gear (a low-speed side speed) L, and changes the rate of rotation input from the transmission 20 and transmits the resultant rotation downstream. That is, the transfer 22 transmits the rotation of the input shaft 42 to the rear-wheel side output shaft 44 via the high-low switching mechanism 48. Also, when transfer torque via the front-wheel drive clutch 50 is zero and the differential locking mechanism 58 is released, power is not transmitted from the rear-wheel side output shaft 44 to the front-wheel side output shaft 52. On the other hand, when torque is transmitted via the front-wheel drive clutch 50 or the differential locking mechanism 58 is engaged, power is transmitted from the rear-wheel side output shaft 44 to the front-wheel side output shaft 52 via the drive gear 46, the front-wheel drive chain 56, and the driven gear 54.

More specifically, the high-low switching mechanism 48 includes a single pinion planetary gear set 60 and a high-low sleeve 62. The planetary gear set 60 includes a sun gear S that is connected to the input shaft 62, in a manner non-rotatable around the axial center C1 with respect to the input shaft 42, a ring gear R that is arranged substantially concentric with the sun gear S and is connected, in a manner non-rotatable around the axial center C1, to the transfer case 40, and a carrier CA that rotatably supports a plurality of pinions P that are in mesh with the sun gear S and the ring gear R, in a manner that enables the pinions P to revolve around the sun gear S. Accordingly, the rotation speed of the sun gear S is the same as that of the input shaft 42, and the rotation speed of the carrier CA is slower than that of the input shaft 42. High-side gear teeth 64 are fixed on an inner peripheral surface of this sun gear S. Low-side gear teeth 66 of the same diameter as the high-side gear teeth 64 are fixed on the carrier CA. The high-side gear teeth 64 are spline teeth that output rotation at the same speed as the input shaft 42 and are involved with establishing the high-speed side gear H. The low-side gear teeth 66 are spline teeth that output rotation at a slower speed than the high-side gear teeth 64 and are involved with establishing the low-speed side gear L. The high-low sleeve 62 is spline engaged with the rear-wheel side output shaft 44 in a manner able to move relative to the rear-wheel side output shaft 44 in a direction parallel to the axial center C1. The high-low sleeve 62 has a fork connecting portion 62a, and outer peripheral teeth 62b that are integrally provided adjacent to the fork connecting portion 62a and mesh with the high-side gear teeth 64 and the low-side gear teeth 66 by the high-low sleeve 62 moving in the direction parallel to the axial center C1 of the rear-wheel side output shaft 44. Rotation at the same speed as the rotation of the input shaft 42 is transmitted to the rear-wheel side output shaft 44 when the outer peripheral teeth 62b are in mesh with the high-side gear teeth 64, and rotation at a slower speed than the rotation of the input shaft 42 is transmitted to the rear-wheel side output shaft 44 when the outer peripheral teeth 62b are in mesh with the low-side gear teeth 66. The high-side gear teeth 64 and the high-low sleeve 62 function as a high-speed side gear clutch for establishing the high-speed side gear H, and the low-side gear teeth 66 and the high-low sleeve 62 function as a low-speed side gear clutch for establishing the low-speed side gear L. The high-low switching mechanism 48 is in a power transmission interrupted state (i.e., a neutral state) when the high-low sleeve 62 is not in mesh with either the high-side gear teeth 64 or the low-side gear teeth 66. The high-low switching mechanism 48 passes through this power transmission interrupted state when switching gears between the high-speed side gear H and the low-speed side gear L.

The differential locking mechanism 58 has locking teeth 68 fixed on an inner peripheral surface of the drive gear 46, and a locking sleeve 70 that has, fixed to an outer peripheral surface thereof, outer peripheral teeth 70a that are spline-engaged with the rear-wheel side output shaft 44 so as to be able to move relative to the rear-wheel side output shaft 44 in a direction parallel to the axial center C1, and that mesh with the locking teeth 68 when the locking sleeve 70 moves in the direction parallel to the axial center C1. In the transfer 22, when the differential locking mechanism 58 is in an engaged state in which the outer peripheral teeth 70a of the locking sleeve 70 are in mesh with the locking teeth 68, the rear-wheel side output shaft 44 and the drive gear 46 rotate together as a unit, such that a center differential locked state is established.

The high-low sleeve 62 is provided in a space on the drive gear 46 side of a support bearing 71 of the input shaft 42 (more specifically, in a space on the drive gear 46 side of the planetary gear set 60). The locking sleeve 70 is provided separate from and adjacent to the high-low sleeve 62, in the space between the high-low switching mechanism 48 and the drive gear 46. The transfer 22 is provided with a first spring 72 between the high-low sleeve 62 and the locking sleeve 70. This first spring 72 is abutted against the high-low sleeve 62 and locking sleeve 70, and urges the high-low sleeve 62 and the locking sleeve 70 away from each other. The transfer 22 is also provided with a second spring 74 between the drive gear 46 and the locking sleeve 70. This second spring 74 is abutted against a protruding portion 44a of the rear-wheel side output shaft 44 and the locking sleeve 70, and urges the locking sleeve 70 toward the side away from the locking teeth 68. The protruding portion 44a is a flange portion of the rear-wheel side output shaft 44 that is provided protruding on the locking teeth 68 side in a space on the radially inner side of the drive gear 46. The high-side gear teeth 64 are provided in a position farther away from the locking sleeve 70 than the low-side gear teeth 66 when viewed in the direction parallel to the axial center C1. The outer peripheral teeth 62b of the high-low sleeve 62 mesh with the high-side gear teeth 64 on the side where the high-low sleeve 62 moves away from the locking sleeve 70 (i.e., on the left side in FIGS. 2 and 3), and mesh with the low-side gear teeth 66 on the side where the high-low sleeve 62 moves toward the locking sleeve 70 (i.e., on the right side in FIGS. 2 and 3). The outer peripheral teeth 70a of the locking sleeve 70 mesh with the locking teeth 68 on the side where the locking sleeve 70 moves toward the drive gear 46 (i.e., on the right side in FIGS. 2 and 3). Therefore, the outer peripheral teeth 70a of the locking sleeve 70 mesh with the locking teeth 68 when the high-low sleeve 62 is in the position in which the outer peripheral teeth 62b of the high-low sleeve 62 are in mesh with the low-side gear teeth 66.

The front-wheel drive clutch 50 is a multiple disc friction clutch that includes a clutch hub 76 that is connected to the rear-wheel side output shaft 44 in a manner unable to rotate relative to the rear-wheel side output shaft 44, a clutch drum 78 that is connected to the drive gear 46 in a manner unable to rotate relative to the drive gear 46, a friction engagement element 80 that is interposed between the clutch hub 76 and the clutch drum 78 and selectively engages and disengages the clutch hub 76 and the clutch drum 78, and a piston 82 that presses on the friction engagement element 80. The front-wheel drive clutch 50 is arranged around the axial center C1 of the rear-wheel side output shaft 44, on the opposite side of the drive gear 46 than the high-low switching mechanism 48 in the axial center C1 direction of the rear-wheel side output shaft 44. The friction engagement element 80 is pressed on by the piston 82 that moves toward the drive gear 46 side. The front-wheel drive clutch 50 is placed in a released state when the piston 82 is moved toward the non-pressing side (i.e., the right side in FIGS. 2 and 3) that is the side away from the drive gear 46 in a direction parallel to the axial center C1, and is not abutting against the friction engagement element 80. On the other hand, the front-wheel drive clutch 50 is placed in a slip state or an engaged state by the transfer torque (torque capacity) being adjusted by the amount of movement of the piston 82, when the piston 82 is moved toward the pressing side (i.e., the left side in FIGS. 2 and 3) that is the side closer to the drive gear 46 in a direction parallel to the axial center C1, and is abutting against the friction engagement element 80.

When the front-wheel drive clutch 50 is in the released state and the differential locking mechanism 58 is in a released state in which the outer peripheral teeth 70a of the locking sleeve 70 are not in mesh with the locking teeth 68, the power transmitting path between the rear-wheel side output shaft 44 and the drive gear 46 is interrupted such that the transfer 22 transmits the power transmitted from the transmission 20 to only the rear wheels 16. When the front-wheel drive clutch 50 is in the slip state or the engaged state, the transfer 22 distributes the power transmitted from the transmission 20 to both the front wheels 14 and the rear wheels 16. When the front-wheel drive clutch 50 is in the slip state, differential rotation is allowed between the rear-wheel side output shaft 44 and the drive gear 46, such that a differential state (center differential unlocked state) is established in the transfer 22. When the front-wheel drive clutch 50 is in the engaged state, the rear-wheel side output shaft 44 and the drive gear 46 rotate together as a unit, such that the center differential locked state is established in the transfer 22. The front-wheel drive clutch 50 is able to continuously change the torque distribution between the front wheels 14 and the rear wheels 16 between 0:100 and 50:50, for example, by controlling the transfer torque.

The transfer 22 also includes, as an apparatus that operates the high-low switching mechanism 48, the front-wheel drive clutch 50, and the differential locking mechanism 58, a motor 84, a screw mechanism 86 that converts the rotational motion of the motor 84 into linear motion, and a transmitting mechanism 88 that transmits the linear motion of the screw mechanism 86 to the high-low switching mechanism 48, the front-wheel drive clutch 50, and the differential locking mechanism 58.

The screw mechanism 86 is arranged on the same axial center C1 as the rear-wheel side output shaft 44, and includes a threaded shaft member 92 (one example of the rotating motion member) that is indirectly connected to the motor 84 via a worm gear 90 provided in the transfer 22, and a nut member 94 (one example of a linear motion member) that is connected to the threaded shaft member 92 so as to be able to move in the direction parallel to the axial center C1 as the threaded shaft member 92 rotates. The screw mechanism 86 is a ball screw in which the threaded shaft member 92 and the nut member 94 operate via multiple balls 96. The worm gear 90 is a gear pair provided with a worm 98 integrally formed on a motor shaft of the motor 84, and a worm wheel 100 that is arranged around the axial center C1 and integrally formed on the threaded shaft member 92. For example, the rotation from the motor 84 that is a brushless motor is reduced in speed and transmitted to the threaded shaft member 92 via the worm gear 90. The screw mechanism 86 converts the rotation of the motor 84 transmitted to the threaded shaft member 92 into linear motion of the nut member 94.

The transmitting mechanism 88 includes a fork shaft 102 that is provided around a different axial center C3 that is parallel to the axial center C1 of the threaded shaft member 92 and is connected to the nut member 94, and a fork 104 that is fixed on the fork shaft 102 and is connected to the high-low sleeve 62. The transmitting mechanism 88 transmits the linear motion force of the nut member 94 of the screw mechanism 86 to the high-low sleeve 62 of the high-low switching mechanism 48 via the fork shaft 102 and the fork 104. Force is applied to both the high-low sleeve 62 and the locking sleeve 70 via the first spring 72, and the locking sleeve 70 receives force from the protruding portion 44a of the rear-wheel side output shaft 44 via the second spring 74. Accordingly, the transmitting mechanism 88 transmits the linear motion force of the nut member 94 of the screw mechanism 86 to the locking sleeve 70 of the differential locking mechanism 58 via the high-low sleeve 62. Therefore, the first spring 72 and the second spring 74 function as members that form a portion of the transmitting mechanism 88.

The screw mechanism 86 is arranged on the opposite side of the front-wheel drive clutch 50 than the drive gear 46. The piston 82 of the front-wheel drive clutch 50 is connected to the nut member 94 of the screw mechanism 86 in a manner non-movable relative to the nut member 94 in the direction parallel to the axial center C1, and rotatable relative to the nut member 94 around the axial center C1. Accordingly, the linear motion force of the nut member 94 of the screw mechanism 86 is transmitted to the friction engagement element 80 of the front-wheel drive clutch 50 via the piston 82. Therefore, the piston 82 is one example of a pressing member that is connected to the nut member 94 and presses on the friction engagement element 80 of the front-wheel drive clutch 50, and functions as a member that forms a portion of the transmitting mechanism 88. In this way, the transmitting mechanism 88 transmits the linear motion force of the nut member 94 of the screw mechanism 86 to the friction engagement element 80 of the front-wheel drive clutch 50.

The transmitting mechanism 88 includes a connecting mechanism 106 that connects the nut member 94 to the fork shaft 102. The connecting mechanism 106 includes two flanged cylindrical members 108a and 108b, a cylindrical spacer 110, a third spring 112, a grasping member 114, and a connecting member 116. The two flanged cylindrical members 108a and 108b are arranged around the axial center C3 and are able to slide on the fork shaft 102 in a direction parallel to the axial center C3. The two flanged cylindrical members 108a and 108b are arranged such that a flange provided on one end portion of the flanged cylindrical member 108a faces a flange provided on one end portion of the flanged cylindrical member 108b. The spacer 110 is interposed between the two flanged cylindrical members 108a and 108b. The third spring 112 is arranged on the outer peripheral side of the spacer 110. The grasping member 114 grasps the two flanged cylindrical members 108a and 108b in a manner able to slide in a direction parallel to the axial center C3. The connecting member 116 connects the grasping member 114 to the nut member 94. The grasping member 114 slides the flanged cylindrical members 108a and 108b on the fork shaft 102 by abutting against the flanges of the flanged cylindrical members 108a and 108b. The length between the flanges when the flanges of the flanged cylindrical members 108a and 108b are abutted against the grasping member 114 is longer than the length of the spacer 110. Therefore, the state in which the flanges are abutted against the grasping member 114 is created by the urging force of the third spring 112.

The fork shaft 102 has stoppers 118a and 118b on an outer peripheral surface. These stoppers 118a and 118b stop the flanged cylindrical members 108a and 108b, respectively, from sliding in the direction parallel to the axial center C3. Stopping the flanged cylindrical members 108a and 108b from sliding with the stoppers 118a and 118b in this way enables the transmitting mechanism 88 to transmit the linear motion power of the nut member 94 to the high-low switching mechanism 48 via the fork shaft 102 and the fork 104.

The outer peripheral teeth 70a of the locking sleeve 70 mesh with the locking teeth 68 when the fork shaft 102 is in a position that places the outer peripheral teeth 62b of the high-low sleeve 62 in mesh with the low-side gear teeth 66 (this position will be referred to as a "low gear position"). The friction engagement element 80 of the front-wheel drive clutch 50 is pressed on by the piston 82 when the fork shaft 102 is in a position that places the outer peripheral teeth 62b of the high-low sleeve 62 in mesh with the high-side gear teeth 64 (this position will be referred to as a "high gear position"). The friction engagement element 80 of the front-wheel drive clutch 50 is not pressed on by the piston 82 when the fork shaft 102 is in the low gear position.

When the fork shaft 102 is in the high gear position, the length between the flanges of the flanged cylindrical members 108a and 108b is able to be changed between the length when the flanges are in a state abutted against the grasping member 114, and the length of the spacer 110. Therefore, the connecting mechanism 106 allows the nut member 94 to move in the direction parallel to the axial center C1, between a position in which the friction engagement element 80 of the front-wheel drive clutch 50 is pressed on by the piston 82 and a position in which the friction engagement element 80 of the front-wheel drive clutch 50 is not pressed on by the piston 82, while the fork shaft 102 remains in the high gear position.

The transfer 22 includes a gear position maintaining mechanism 120 that maintains the high gear position of the fork shaft 102, and maintains the low gear position of the fork shaft 102. The gear position maintaining mechanism 120 includes a housing hole 122, a locking ball 124, a locking spring 126, and recessed portions 128$h$ and 128$l$. The housing hole 122 is formed in an inner peripheral surface of the transfer case 40 along which the fork shaft 102 slides. The locking ball 124 is housed in the housing hole 122. The locking spring 126 is housed in the housing hole 122 and urges the locking ball 124 toward the fork shaft 102 side. The recessed portions 128$h$ and 128$l$ are formed on an outer peripheral surface of the fork shaft 102. The recessed portion 128$h$ receives a portion of the locking ball 124 when the fork shaft 102 is in the high gear position, and the recessed portion 128$l$ receives a portion of the locking ball 124 when the fork shaft 102 is in the low gear position. By maintaining the gear position (either the high or the low gear position) of the fork shaft 102 with the gear position maintaining mechanism 120, the gear position of the fork shaft 102 is able to be maintained even if output from the motor 84 is stopped in that gear position.

The transfer 22 includes a low gear position detection switch 130 that detects the low gear position of the fork shaft 102. The low gear position detection switch 130 is a ball-type contact switch, for example. The low gear position detection switch 130 is fixed in a through hole 132 formed in the transfer case 40, at a position contacting the fork shaft 102 when the fork shaft 102 has moved to the low gear position. When the low gear position is detected by the low gear position detection switch 130, an indicator for notifying a driver that the center differential locked state is established in the low-speed side gear L, for example, is illuminated.

Returning now to FIG. 1, an electronic control unit (ECU) 200 that includes a control apparatus of the vehicle 10 that switches between 2WD and 4WD, for example, is provided in the vehicle 10. The ECU 200 includes a so-called microcomputer that includes, for example, a CPU, RAM, ROM, and an input/output interface and the like. The CPU executes various controls of the vehicle 10 by processing signals according to a program stored in the ROM in advance, while using the temporary storage function of the RAM. For example, the ECU 200 executes output control that controls the output of the engine 12, and switching control to switch the driving state of the vehicle 10, and the like, and is formed divided into sections for engine control and driving state control and the like as necessary. As shown in FIG. 1, various actual values based on detection signals from various sensors provided in the vehicle 10 are supplied to the ECU 200. Examples of such actual values include an engine speed Ne, a motor rotation angle θm, wheel speeds Nwfl, Nwfr, Nwrl, and Nwrr of the front wheels 14L and 14R and the rear wheels 16L and 16R, an accelerator operation amount θacc, an H-range request Hon that is a signal indicating that an H-range selector switch 210 has been operated, a 4WD request 4WDon that is a signal indicating that a 4WD selector switch 212 has been operated, and LOCKon that is a signal indicating that a differential lock selector switch 214 has been operated, and the like. Examples of the various sensors include an engine speed sensor 202, a motor rotation angle sensor 204, wheel speed sensors 206, an accelerator operation amount sensor 208, a H-range selector switch 210 for selecting the high-speed side gear H in response to an operation by the driver, a 4WD selector switch 212 for selecting 4WD in response to an operation by the driver, and a differential lock selector switch 214 for selecting the center differential locked state in response to an operation by the driver, and the like. An engine output control command signal Se for output control of the engine 12, an operation command signal Sd for switching the state of the front-side clutch 36, and a motor drive command signal Sm for controlling the rotation amount of the motor 84 and the like are output from the ECU 200 to an output control apparatus of the engine 12, an actuator of the front-side clutch 36, and the motor 84, and the like, respectively, as shown in FIG. 1.

In the vehicle 10 structured as described above, the amount of movement (i.e., the stroke) of the nut member 94 is controlled by controlling the rotation amount of the motor 84. When the fork shaft 102 is in the high gear position, the position in which the front-wheel drive clutch 50 is placed in the released state by driving the motor 84 a predetermined rotation amount to move the nut member 94 by a predetermined stroke amount toward the non-pressing side from a position in which the piston 82 is abutted against the friction engagement element 80, is a position (referred to as an "H2 position") that places the vehicle 10 in the 2WD running state in which only the rear wheels 16 are driven in the high-speed side gear H. When the front-side clutch 36 is placed in the released state in this H2 position, rotation is not transmitted from either the engine 12 side or the front wheel 14 side, to the rotating elements (e.g., the drive gear 46, the front-wheel drive chain 56, the driven gear 54, the front-wheel side output shaft 52, the front propeller shaft 24, and the front wheel differential gear unit 28) that form the power transmitting path from the drive gear 46 to the front wheel differential gear unit 28, when running in 2WD. Therefore, when running in 2WD, these rotating elements are stopped from rotating and are prevented from being dragged along, so running resistance is reduced.

Also, as shown in FIG. 2, for example, when the fork shaft 102 is in the high gear position, the position in which the front-wheel drive clutch 50 is placed in the slip state by controlling the rotation amount of the motor 84 to move the nut member 94 toward the pressing side from the position where the piston 82 abuts against the friction engagement element 80, is a position (referred to as an "H4 position") that places the vehicle 10 in the 4WD running state in which power is transmitted to both the front wheels 14 and the rear wheels 16 in the high-speed side gear H. In this H4 position, torque distribution between the front wheels 14 and the rear wheels 16 is adjusted as necessary by controlling the transfer torque of the front-wheel drive clutch 50.

Also, as shown in FIG. 2, for example, the position in which the front-wheel drive clutch 50 is placed in the engaged state by controlling the rotation amount of the motor 84 to move the nut member 94 farther to the pressing side from the H4 position, is a position (referred to as an "H4L position") for placing the vehicle 10 in the 4WD running state in the center differential locked state in the high-speed side gear H.

Figure 4:
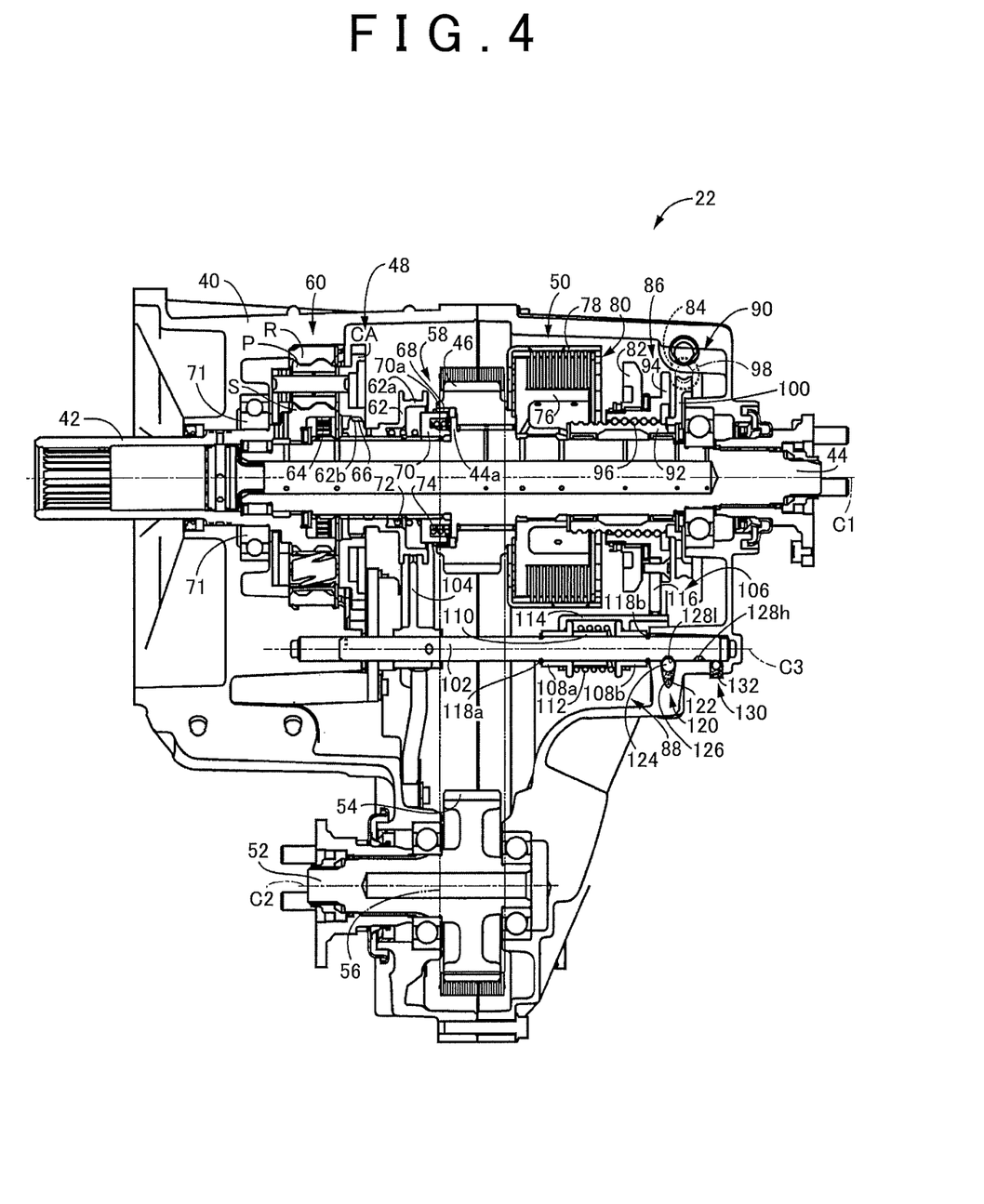
FIG. 4 is a sectional view schematically showing the structure of a transfer according to the example embodiment, and illustrates the manner for switching to the 4WD running state in a center differential locked state in a low-speed side gear.

Also, when the fork shaft 102 is in the low gear position, the front-wheel drive clutch 50 is in the released state and the differential locking mechanism 58 is in the engaged state, as shown in FIG. 4, so this position is a position (referred to as an "L4 position") that places the vehicle 10 in the 4WD running state in the center differential locked state in the low-speed side gear L.

The switch between the high gear position and the low gear position of the fork shaft 102 is performed when the transmission 20 is in a neutral state while the vehicle 10 is stopped, for example. Therefore, in the differential locking mechanism 58, if the phases of the outer peripheral teeth 70a of the locking sleeve 70 and the locking teeth 68 do not match, the movement between engagement and release may not be able to be smooth. To counteract this kind of problem, the high-low sleeve 62 is provided separate from the locking sleeve 70, so the high-low sleeve 62 is able to move even if the locking sleeve 70 is not, when the fork shaft 102 switches between the high gear position and the low gear position. Therefore, when the fork shaft 102 switches between the high gear position and the low gear position, the high-low sleeve 62 will not stop moving in a position that would place the high-low switching mechanism 48 in a neutral state, so power transfer to at least the rear wheel 16 side is able to be ensured.

As described above, according to this example embodiment, the transfer 22 is provided with the motor 84, the screw mechanism 86, and the transmitting mechanism 88, so high thrust is able to be applied to the front-wheel drive clutch 50 by the high boost function of the screw mechanism 86. Also, the stroke necessary to operate the high-low switching mechanism 48 is able to be obtained by the screw mechanism 86. Therefore, the switching operation of the high-low switching mechanism 48 and the torque adjustment of the front-wheel drive clutch 50 (i.e., the adjustment of transfer torque transmitted to the drive gear 46 (in other words, the front wheels 14)) are made possible by the one motor 84, the screw mechanism 86, and the transmitting mechanism 88. That is, by using the screw mechanism 86 as a conversion mechanism to convert the rotational motion of the motor 84 into linear motion, the switching operation of the high-low switching mechanism 48 and the torque adjustment of the front-wheel drive clutch 50 are able to be performed with the same system. As a result, the number of parts, the weight, the cost, and the size of the transfer 22 are able to be reduced.

Also, according to this example embodiment, the transmitting mechanism 88 transmits the linear motion force of the screw mechanism 86 to the differential locking mechanism 58, so the switching operation of the differential locking mechanism 58 (i.e., the transmission and interruption of power to the drive gear 46) is possible with the same system using the screw mechanism 86.

Further, according to this example embodiment, the locking sleeve 70 is provided separate from and adjacent to the high-low sleeve 62, in the space between the high-low switching mechanism 48 and the drive gear 46, and the transmitting mechanism 88 has the first spring 72 and the second spring 74, so the high-low sleeve 62 is able to move regardless of whether the locking sleeve 70 is able to move. Also, even if the high-low sleeve 62 and the locking sleeve 70 are provided separately, the locking sleeve 70 is able to be moved toward the side away from the locking teeth 68 if the high-low sleeve 62 is moved toward the side away from the locking sleeve 70.

Also, according to this example embodiment, the transmitting mechanism 88 has the connecting mechanism 106, so in a vehicle state in which the high-low sleeve 62 is in mesh with the high-side gear teeth 64 and is thus able to transmit relatively high-speed rotation to the rear-wheel side output shaft 44 (i.e., the rear wheels 16), torque that has been adjusted via the front-wheel drive clutch 50 is able to be transmitted to the drive gear 46 (i.e., the front wheels 14). Also, in this vehicle state, the locking sleeve 70 will of course not mesh with the locking teeth 68, and the front-wheel drive clutch 50 will not be pressed on by the piston 82, so power is able to be transmitted only to the rear wheels 16. On the other hand, in a vehicle state in which the high-low sleeve 62 is in mesh with the low-side gear teeth 66 and is thus able to transmit relatively low-speed rotation to the rear-wheel side output shaft 44, the locking sleeve 70 is in mesh with the locking teeth 68, and the rear-wheel side output shaft 44 and the drive gear 46 are placed in a directly-coupled state (direct drive state) by the differential locking mechanism 58.

Also, according to this example embodiment, the screw mechanism 86 is a ball screw, so high thrust is able to be applied to the front-wheel drive clutch 50 by the high boost function of the ball screw. Also, the stroke necessary to operate the high-low switching mechanism 48 is able to be obtained by the ball screw. Further, the mechanical efficiency with which rotational motion is converted into linear motion is higher than it is when using a slip screw as the conversion mechanism to convert the rotational motion of the motor 84 into linear motion.

Heretofore, an example embodiment of the invention has been described in detail with reference to the drawings, but the invention may also be applied in other forms.

For example, in the example embodiment described above, a ball screw is given as an example of the screw mechanism 86, but the screw mechanism 86 is not limited to this. For example, as long as the screw mechanism 86 is a conversion mechanism that converts the rotational motion of the motor 84 into linear motion, the screw mechanism 86 may also be a mechanism in which a shaft of a simple bolt is combined with a nut, for example. More specifically, the screw mechanism 86 may be a slip screw or the like. When the screw mechanism 86 is a slip screw, the mechanical efficiency with which rotational motion is converted into linear motion is lower than it is with a ball screw, but certain effects, such as that high thrust is able to be applied to the front-wheel drive clutch 50, and the stroke necessary to operate the high-low switching mechanism 48 is able to be obtained, are able to be obtained.

Also, in the example embodiment described above, the screw mechanism 86 is indirectly connected to the motor 84 via the worm gear 90, but the screw mechanism 86 is not limited to this. For example, the threaded shaft member 92 of the screw mechanism 86 and the motor 84 may be directly connected without using the worm gear 90. More specifically, the threaded shaft member 92 and the motor 84 may be directly connected such that a pinion provided on the motor shaft of the motor 84 is in mesh with gear teeth formed on the threaded shaft member 92.

Further, in the example embodiment described above, an FR-based four-wheel-drive vehicle is given as an example of the vehicle 10 to which the transfer 22 is applied, but the vehicle 10 to which the transfer 22 is applied is not limited to this. For example, the vehicle 10 to which the transfer 22 is applied may also be a front engine front wheel drive (FF)-based four-wheel-drive vehicle. Also, the front-wheel drive clutch 50 is described as being a multiple disc clutch, but the invention may also be applied when the front-wheel drive clutch is a single disc clutch. Further, the transfer 22 does not have to be provided with the gear position maintaining mechanism 120 and the low gear position detection switch 130.

Further, in the example embodiment described above, an internal combustion engine such as a gasoline engine or a diesel engine, for example, may be used as the engine 12 that given as an example of the driving force source. Also, another prime mover such as an electric motor, for example, may be used either alone or in combination with the engine 12, as the driving force source. Further, the transmission 20 is any one of a variety of automatic transmissions such as a planetary gear type stepped transmission, a continuously variable transmission (CVT), or a synchronous mesh twin shaft parallel axis-type automatic transmission (including a known DCT), or a known manual transmission. Also, the front-side clutch 36 is described as being an electromagnetic dog clutch, but the front-side clutch 36 is not limited to this. For example, the front-side clutch 36 may also be a type of friction clutch or a dog clutch that is provided with a shift fork that moves the sleeve in the axial direction, in which the shift fork is driven by an electrically controllable or hydraulically controllable actuator, or the like.

The example embodiments described above are no more than example embodiments. That is, the invention may be carried out in modes that have been modified or improved in any of a variety of ways based on the knowledge of one skilled in the art.

What is claimed is:

1. A transfer for a vehicle, the vehicle including first left and right wheels and second left and right wheels, the transfer comprising:
    an input rotating member;
    a first output rotating member configured to output power to the first left and right wheels;
    a second output rotating member configured to output power to the second left and right wheels;
    a high-low switching mechanism configured to change a rate of rotation from the input rotating member and transmit the rotation to the first output rotating member;
    a clutch configured to adjust a transfer torque, the transfer torque being transmitted from the first output rotating member to the second output rotating member;
    a motor;
    a screw mechanism configured to convert rotational motion of the motor to linear motion; and
    a transmitting mechanism configured to transmit linear motion force of the screw mechanism to both the high-low switching mechanism and the clutch, wherein
    the screw mechanism includes a rotating motion member and a linear motion member, the rotating motion member being directly or indirectly connected to the motor, the linear motion member being connected to the rotating motion member in a manner movable in a direction parallel to an axial center of the rotating motion member in response to rotation of the rotating motion member,
    the high-low switching mechanism includes a high-low sleeve, high side gear teeth that output rotation, and low side gear teeth that output rotation at a slower speed than the high side gear teeth, the high-low sleeve is splined engaged with the first output rotating member, and the high-low sleeve is configured to move in a direction parallel to the axial center of the first output rotating member such that the high-low sleeve meshes with the high side gear teeth and the low side gear teeth, respectively, and
    the transmitting mechanism includes a pressing member, a fork shaft and a fork, the pressing member is connected to the linear motion member, the pressing member is configured to press on the clutch, the fork shaft is provided around another axial center that is parallel to the axial center of the rotating motion member, and the fork shaft is connected to the linear motion member, and the fork is fixed on the fork shaft and the fork is connected to the high-low sleeve.

2. The transfer according to claim 1, further comprising:
    a dog clutch configured to connect the first output rotating member and the second output rotating member together in an integrated manner,
    wherein the transmitting mechanism is configured to transmit the linear motion force of the screw mechanism to the dog clutch.

3. The transfer according to claim 1, further comprising:
    a dog clutch including locking teeth and a locking sleeve, the locking teeth being provided on the second output rotating member, and the locking sleeve being spline engaged with the first output rotating member, the locking sleeve being configured to move in the direction parallel to the axial center of the first output rotating member such that the locking sleeve meshes with the locking teeth,
    wherein the transmitting mechanism is configured to transmit the linear motion force of the screw mechanism to the locking sleeve via the high-low sleeve.

4. The transfer according to claim 3, wherein
    the high-low sleeve is provided between the second output rotating member and a support bearing of the input rotating member;
    the locking sleeve is provided separate from and adjacent to the high-low sleeve, between the high-low switching mechanism and the second output rotating member; and
    the transmitting mechanism includes a first spring and a second spring, the first spring urging the high-low sleeve and the locking sleeve toward sides away from each other, the second spring urging the locking sleeve toward a side away from the locking teeth.

5. The transfer according to claim 4, wherein
    the high-low sleeve is configured to mesh with the high side gear teeth on the side away from the locking sleeve, and the high-low sleeve is configured to mesh with the low side gear teeth on the side near the locking sleeve;
    the locking sleeve is configured to mesh with the locking teeth when the fork shaft is in a position that places the high-low sleeve in mesh with the low side gear teeth;
    the clutch is arranged around an axial center of the first output rotating member in a position on an opposite side of the second output rotating member than the high-low switching mechanism, in an axial direction of the first output rotating member, the clutch is pressed on by the pressing member that moves toward the second output rotating member side, the clutch is pressed on by the pressing member when the fork shaft is in a position that places the high-low sleeve in mesh with the high side gear teeth, the clutch is not pressed on by the pressing member when the fork shaft is in a position that places the high-low sleeve in mesh with the low side gear teeth; and
    the transmitting mechanism includes a connecting mechanism, the connecting mechanism being configured to connect the linear motion member with the fork shaft such that the linear motion member moves between a position where the clutch is pressed on by the pressing member and a position where the clutch is not pressed on by the pressing member, while the fork shaft remains in a position that places the high-low sleeve in mesh with the high side gear teeth.

6. The transfer according to claim 1, wherein
the rotating motion member is a threaded shaft member;
the linear motion member is a nut member; and
the screw mechanism is a ball screw in which the threaded shaft member and the nut member operate via a ball.

7. The transfer according to claim 1, wherein the clutch is a multiple disc clutch.

8. The transfer according to claim 1, wherein the clutch is a single disc clutch.

* * * * *